No. 730,967. PATENTED JUNE 16, 1903.
H. G. REIST.
DYNAMO ELECTRIC MACHINE.
APPLICATION FILED FEB. 27, 1897.
NO MODEL. 3 SHEETS—SHEET 3.
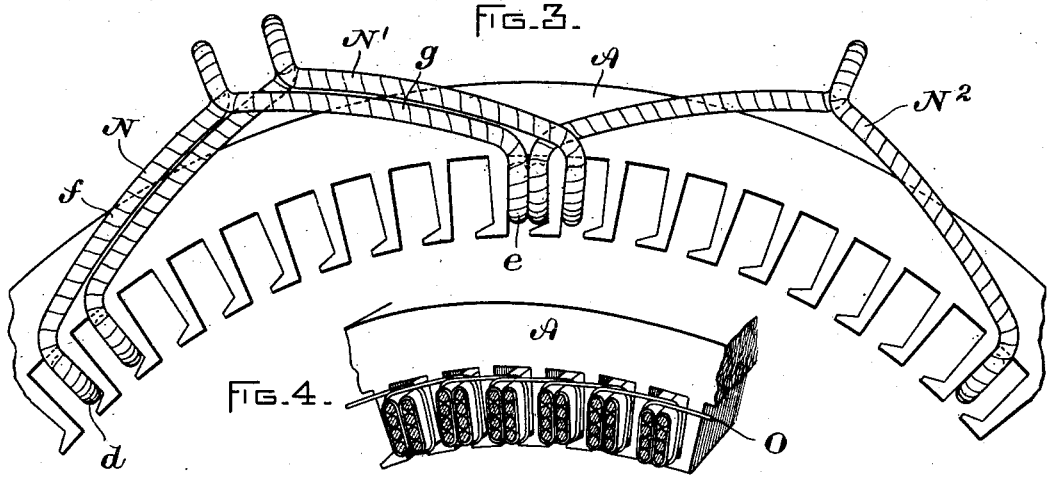
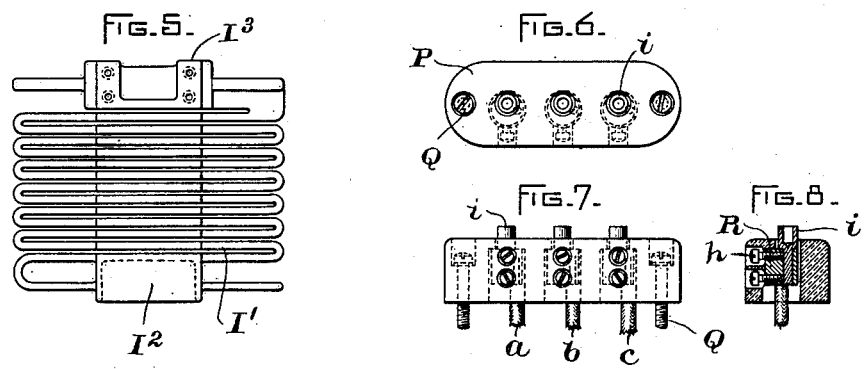
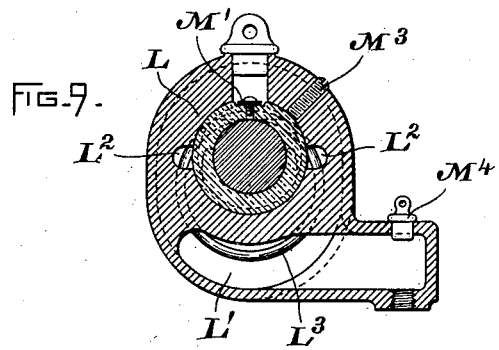
WITNESSES:
A. H. Abell.
A. F. Macdonald.
INVENTOR.
Henry G. Reist,
by Geo. R. Blodgett,
Atty.

No. 730,967. Patented June 16, 1903.

UNITED STATES PATENT OFFICE.

HENRY G. REIST, OF SCHENECTADY, NEW YORK, ASSIGNOR TO THE GENERAL ELECTRIC COMPANY, A CORPORATION OF NEW YORK.

DYNAMO-ELECTRIC MACHINE.

SPECIFICATION forming part of Letters Patent No. 730,967, dated June 16, 1903.

Application filed February 27, 1897. Serial No. 625,323. (No model.)

*To all whom it may concern:*

Be it known that I, HENRY G. REIST, a citizen of the United States, residing at Schenectady, in the county of Schenectady, State of New York, have invented certain new and useful Improvements in Dynamo-Electric Machines, of which the following is a specification.

My present invention relates to dynamo-electric machines, and more particularly to alternating-current induction-motors, though certain of its features are applicable to dynamo-electric machines in general.

In most induction-motors it is necessary to provide resistance for reducing the current induced in the secondary member at the time of starting, this resistance being cut out as soon as the motor attains its normal speed; and my invention has for one of its objects to simplify and lessen the cost of the resistance mounted within the revolving member of the motor and to provide a simple device accessible from the outside for varying the amount of resistance included in the circuit of the secondary member.

In dynamo-electric machines having windings which extend beyond the cores it is necessary to provide coil-supports, which are usually formed by the end flanges which secure the laminæ of the core together. These flanges are ordinarily made of iron and heretofore have been so constructed and arranged that the ends of the winding rest directly thereon. I have found that when the flanges are so arranged they become magnetized in such a direction as to oppose the passage of current through that portion of the winding which is situated directly over the flanges and also that there is considerable heating in the flange itself, due to eddy-currents. This is especially true in the alternating-current machines.

My invention accordingly has for a further object to so construct and arrange the end flanges which furnish supports for the overhanging ends of the winding that the objections above pointed out will be obviated.

My invention also comprises certain detail features relating to the construction of dynamo-electric machines in general, which will be hereinafter fully described, and specifically pointed out in the claims appended to this specification.

Figure 1:
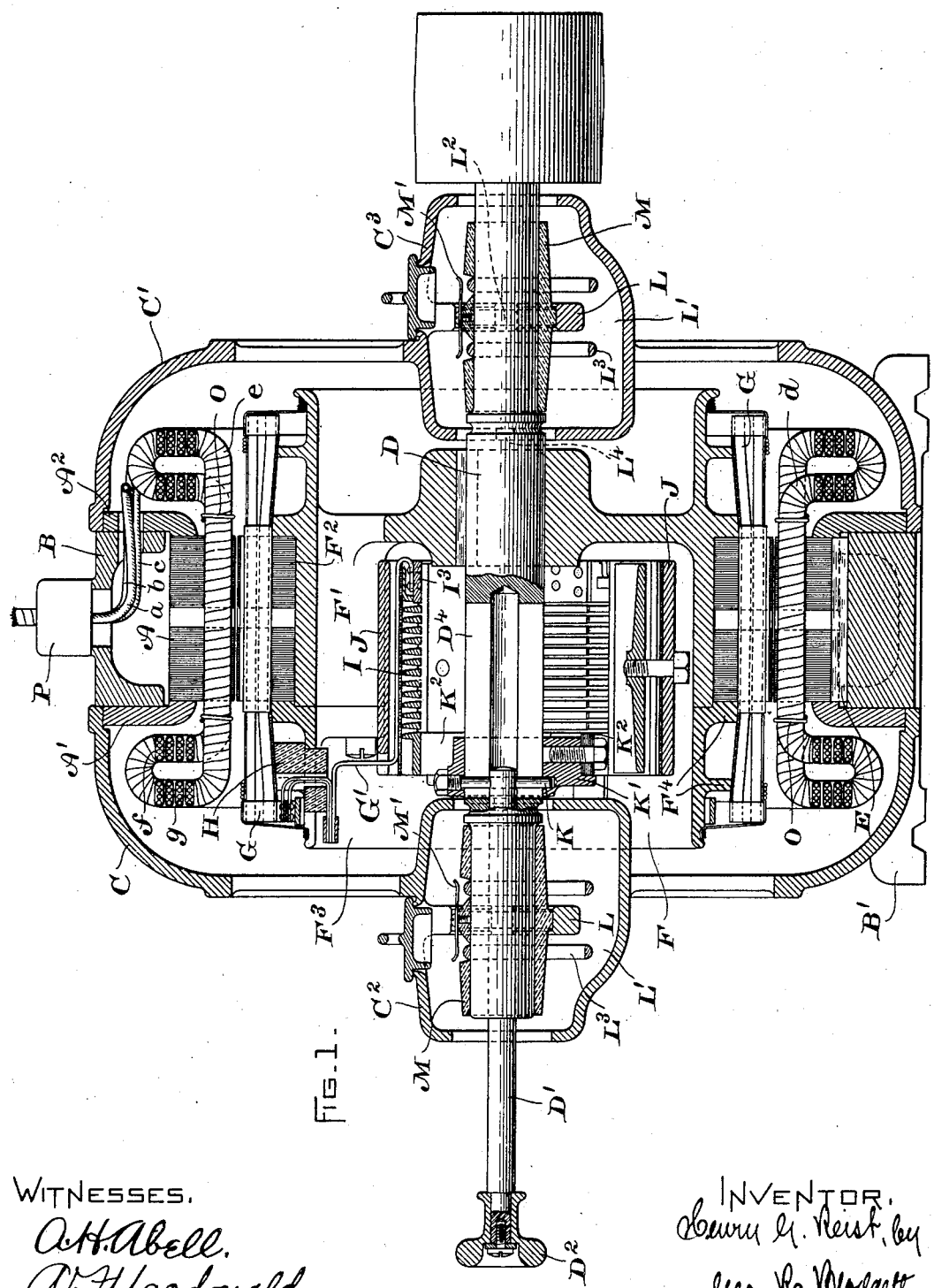
Figure 2:
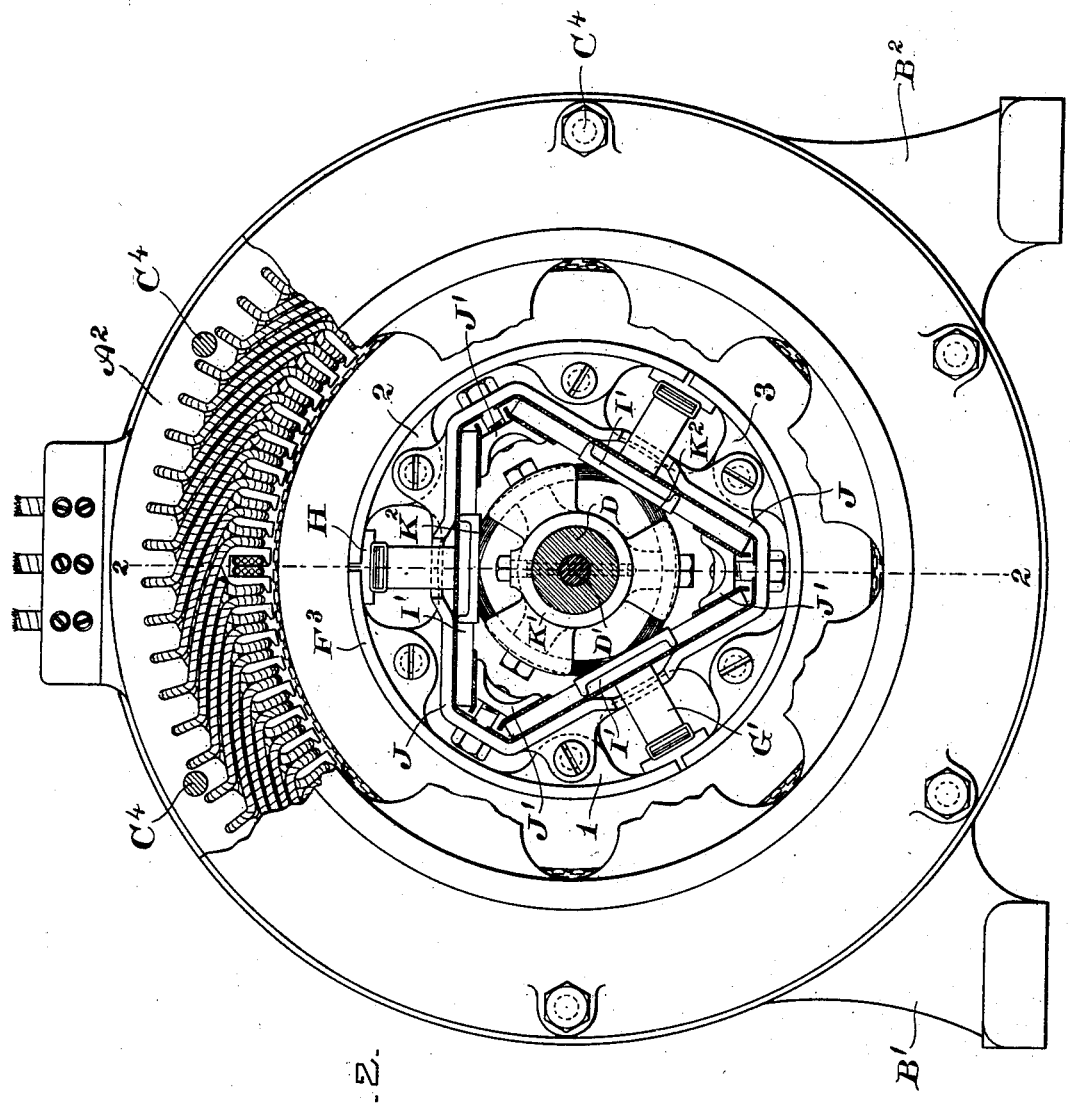

In the accompanying drawings, attached to and made a part of this specification, Figure 1 is a longitudinal section of a dynamo-electric machine, taken on the line 2 2 of Fig. 2. Fig. 2 is an end elevation with certain of the parts broken away. Fig. 3 is a detail of the winding. Fig. 4 is a detail of the winding, showing the method of securing it in position. Fig. 5 is a detail of the resistance. Figs. 6, 7, and 8 are details of the connection-board, and Fig. 9 is a cross-section taken through one of the bearings.

The machine which I have illustrated in the drawings is an alternating-current induction-motor. The laminated field-core A, which supports the primary winding, is circular in form, and the laminæ are clamped between end plates $A'$ $A^2$. A ring-shaped casting B surrounds the laminated field-core and forms a support for the outer portion of the end plates $A'$ and $A^2$. Extending outwardly from the casting are projections $B'$ $B^2$, which form the base for the machine. To prevent the laminated core from moving independently of the ring-shaped casting, a key E is provided, located at the base of the machine. Surrounding the ends of the machine are castings C $C'$. These are provided with bearings $C^2$ $C^3$ for the armature-shaft D. Extending through the castings C $C'$, the ring-shaped casting B, and the end plates $A'$ $A^2$ are bolts $C^4$, Fig. 2, which serve to clamp the several parts together.

On the top of the machine is located a connection-board P, the construction of which will be hereinafter explained. Passing through a hole in the plate $A^2$ and casting B are leads *a b c*, which are connected to the primary or field winding.

The armature or secondary member F is mounted for rotary movement on the shaft D and comprises a cylindrical spider $F'$, upon which are mounted the laminæ $F^2$. The laminæ are clamped between a flange formed integral with the spider and an end plate $F^3$, which is secured to the spider by screws. The end plate is provided with raised portions or ribs $F^4$, upon which the ends of the winding rest at two points. It will be seen that the ribs $F^4$ are the only portions of the end plate which are in close proximity to the winding G, and being limited in cross-section the amount of magnetism created therein is limited and does not substantially affect the passage of current in the end conductors of the armature, and the main body of iron being located at a distance from the winding is substantially free from eddy-currents and consequent heating. The pulley end of the armature-spider is also provided with a coil-support which resembles $F^3$ in that it is provided with ribs upon which the winding G rests; but instead of being separable it is formed integral with the spider.

The end plate $F^3$ is slotted at three places one hundred and twenty degrees apart, Figs. 1 and 2, and insulators H are mounted therein through which extend the leads $G'$ from the armature-winding G to the resistance I. The resistance I consists of three metal grids $I'$, Fig. 5, each made of a zigzag piece of cast metal provided with a terminal plate $I^2$, located at the outer end, and a plate $I^3$ at the inner end, to which is secured one of the armature-leads. Extending toward the center of the end plate $F^3$ are three lugs 1 2 3, to which is secured by screws the triangular frame J, the latter forming a support for the resistance-grids $I'$. The resistance-grids $I'$ are held in position on the triangular frame by means of wedge-shaped pieces $J'$, the latter being secured to the frame at the apexes by bolts. Between the casting and the grids and between the wedge-shaped pieces and the grids is suitable insulation.

The left-hand end of the armature-shaft D is bored out, and mounted for reciprocating movement therein is a rod $D'$, provided with a handle $D^2$, which is free to turn. A pin K on the inner end of the rod is secured to the sliding ring $K'$ by suitable means and is arranged to reciprocate in the slot $D^4$ of the armature-shaft. Mounted in supports on the sliding ring are three laminated copper brushes $K^2$, Figs. 1 and 2. These are adapted to engage with the resistance-grids $I'$ and vary the resistance of the armature or secondary circuit as the handle $D^2$ is moved toward or away from the machine. Under normal operation the handle $D^2$ revolves with the rod $D'$ and shaft D; but being loosely mounted on the rod it can readily be stopped when it is desired to vary the armature-resistance by moving the laminated copper brushes in or out. The resistance-grids $I'$ may be used in connection with a Y or delta-connected armature; but as the method of connection forms no part of the invention it is not illustrated.

The end castings C $C'$ are curved outward and downward to protect the field and armature coils from dirt and injury. Each casting is provided with a bearing formed integral therewith, and the bearings are made in one piece, thereby doing away with all joints and machine-work. In the center of each bearing is a narrow circular rib or projection L, Figs. 1 and 9. This is cut away at the top to allow oil to be poured into the chamber $L'$ and at $L^2$ to permit the insertion of oil-rings $L^3$. The holes at both ends of the bearing are of the same diameter as that through the rib or projection L and are bored out at the same time. This reduces the cost of machine-work, for one tool does all the work.

In assembling the bearing the oil-rings $L^3$, which have a greater diameter than the holes at the end of the bearing, are placed in a horizontal position and inserted through the openings $L^4$ in the inside end of the bearing, the right-hand ring being also inserted through the openings $L^2$ in the projection L. The bearing-sleeve M is then inserted and the rings $L^3$ slipped over the sleeve and retained in position by the spring $M'$. The opposite bearing is assembled in the same manner and the whole casting applied to the end of the machine.

After the machine has been assembled and the bearing-sleeves M placed in alinement they are secured in position by means of set-screws $M^3$, Fig. 9.

Referring to Fig. 9, it will be seen that the oil-chamber $L'$ is provided with an extension to increase its capacity, and by providing a loose-fitting plug $M^4$ the oil will overflow at this point instead of working back and along the armature-shaft into the winding.

In Fig. 3 is shown an enlarged detail view of the primary winding. The core A is made of laminated iron and is provided with teeth, each tooth being made with an overhanging portion, which is substantially equal to one-half the width of a slot. The coils N $N'$ $N^2$ are machine-wound counterpart coils and, as shown in the drawing, are each provided with a long and a short side. Referring to the coils, $d$ represents the short side, and $e$ the long side. These sides extend across the core parallel with the armature-shaft at opposite polar points and are connected by end portions $f$ and $g$, $f$ forming a part of the inside and $g$ the outside series. The end portions are joined or connected by flattened webs, which stand radial to the core. In mounting the coils on the core the short side $d$ of each coil is placed in the proper slot, and as soon as a number greater than the number of slots between the sides $d$ and $e$ have been inserted in position the long sides $e$ are inserted in place, which forces the short side $d$ of an adjacent coil under the overhanging part of the tooth. This serves to hold the short side in place. To further secure the coils in place, a wire O, Figs. 1 and 4, is wrapped around the coils located in each slot. The wire may be given more than one turn around each pair of coils, if desired, before progressing to the next pair; but I have found that a single turn works very successfully and does away with the use of the wedges commonly employed to secure the coils in place.

N N² show the relation which the coils bear to each other when in position, and coil N' shows the way the outside end $g$, which is connected to the long side of the coil, extends over the inside end $f$, which is connected to the short side.

Referring to Fig. 1, it will be seen that all of the end portions $g$ form an outside series of connections and all of the end portions $f$ an inside series.

The sides of each coil are located side by side instead of one below the other, as heretofore.

Figs. 6, 7, and 8 are details of my improved connection-board P, which is located on the top of the casting B, Figs. 1 and 2. The insulating portion is preferably made of porcelain and is secured to its support by countersunk screws Q. The leads $a\ b\ c$, which extend from the field-winding, are soldered to terminals R. These terminals are circular in form, and each is provided with a hole placed eccentrically for the reception of the terminal $i$, which is connected to a main. The terminal R is mounted in position before the small terminal $i$, after which the binding-screws $h$ are inserted to secure them together, the screws also serving to hold the terminals in the body of insulating material.

It will be seen that all the metal parts, with the exception of the top of the terminal $i$, are covered by the main body of insulation, and in practice tape is wound around this terminal at the time the main is secured thereto. This prevents persons from receiving shocks and also short-circuiting between terminals.

What I claim as new, and desire to secure by Letters Patent of the United States, is—

1. In an alternating-current induction-motor, a revolving member mounted on a spider, grids of resistance material mounted between the arms of said spider, and connections from said grids to the winding on the revolving member.

2. In an alternating-current induction-motor, a revolving member mounted on a spider, grids of resistance material mounted between the arms of said spider, leads connecting said grids in circuit with the winding on the revolving member, and means for gradually cutting said grids out of circuit with the said winding.

3. In a dynamo-electric machine, the combination of a revolving member, resistance-grids mounted on said member, and brushes engaging with said grids.

4. In a dynamo-electric machine, the combination of a revolving member provided with a suitable winding, resistance-grids mounted on said member and included in circuit with said winding, short-circuiting brushes engaging with said grids, and means for operating said brushes to cut the grids out of circuit with the winding.

5. In a dynamo-electric machine, the combination of a revolving member, a frame secured to the revolving member, resistance-grids mounted on the frame, means securing the grids to the frame, and brushes for changing the resistance of the grids.

6. In a dynamo-electric machine, the combination of a revolving member, resistances carried by said member and included in circuit with the winding thereon, brushes for cutting said resistances out of circuit with the winding, a sliding support for said brushes, and a rod mounted in a hole bored in the end of the armature-shaft and secured to said sliding support, the said rod being adapted to be reciprocated to move the said brushes.

7. In a dynamo-electric machine, the combination of a revolving member, resistance-grids carried by said member, brushes for changing the resistance of said grids, a sliding support for said brushes, and a rod for moving the brushes, extending through a hole in the armature-shaft and secured to said sliding support.

8. In a dynamo-electric machine, the combination of a revolving member, a frame secured to lugs on the revolving member, resistance-grids carried by the frame, brushes mounted on a sliding support and engaging with the grids, and a rod extending through a hole in the armature-shaft and secured to the sliding support for moving the brushes.

9. In a dynamo-electric machine, the combination of a revolving member, a triangular frame secured to the revolving member, resistance mounted on the inside of the frame, clamping-wedges at the apexes of the triangular frame securing the resistance to the frame, a sliding ring mounted on the armature-shaft, a rod mounted in a hole in the armature-shaft and secured to the sliding ring, laminated copper brushes mounted on the sliding ring and engaging with the resistance, and a handle loosely mounted on the rod and located outside of the machine for actuating the brushes.

10. In a dynamo-electric machine, the combination of a laminated core, a winding mounted on the core and provided with an overhanging portion, a spider or support for the core, flanges projecting from said spider, and ribs or raised portions on the flanges for supporting the overhanging ends of the winding.

11. In a dynamo-electric machine, the combination of a winding having ends projecting beyond the core, with end supports for the windings, consisting of ribs or flanges on the end plates, whereby the windings are supported free from the main body of the end plates, as described.

12. In a winding for a dynamo-electric machine, the combination of a toothed laminated core, a number of coils mounted in the slots between the teeth and so arranged that the sides of adjacent coils lie side by side in the same slot, and a wire wrapped around each pair of coils binding them together, as described.

13. In a winding for dynamo-electric machines, the combination of a laminated toothed core, an overhanging part or parts for each tooth, a number of counterpart coils, having the sides of adjacent coils side by side in the same slot, one of said side portions being held in place by the overhanging part of a tooth, and the other side portion secured to the first by a single wire which is wrapped around each pair of coils in turn as it passes around the core.

In witness whereof I have hereunto set my hand this 25th day of February, 1897.

HENRY G. REIST.

Witnesses:
B. B. HULL,
M. H. EMERSON.